WRITTEN CHARACTER DIGITIZER
Filed Aug. 8, 1960 2 Sheets-Sheet 1
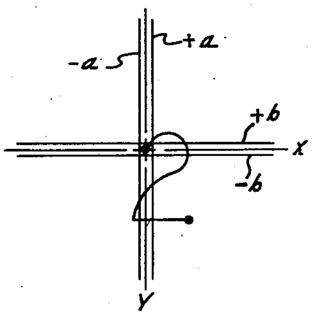
FIG. 1.
FIG. 2.
| NUMBER | CODE NUMBER -a +a -b -b |
|---|---|
| 0 | 2220 |
| | 3220 |
| | 3230 |
| 1 | 0010 |
| | 1010 |
| 2 | 0312 |
| | 2312 |
| 3 | 0412 |
| | 1412 |
| | 3412 |
| 4 | 0120 |
| | 2120 |
| | 3120 |
| 5 | 0310 |
| | 1310 |
| | 3110 |
| | 3310 |
| 6 | 3010 |
| | 3210 |
| 7 | 0110 |
| | 0210 |
| | 1210 |
| 8 | 2022 |
| | 2023 |
| | 2123 |
| | 4320 |
| | 4321 |
| | 4420 |
| 9 | 2030 |
| | 2032 |
| | 3030 |
| | 3032 |
FIG. 4.
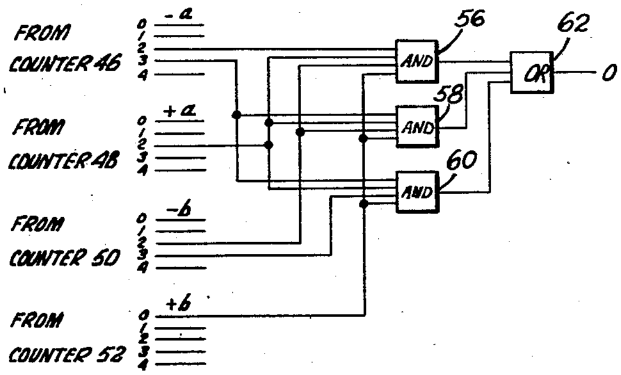
INVENTORS.
EDWIN A. PECKER
PETER LEGH GARRETT
BY Christie, Parker & Hale
ATTORNEYS.

WRITTEN CHARACTER DIGITIZER

Filed Aug. 8, 1960 2 Sheets-Sheet 2

INVENTORS.
EDWIN A. PECKER
PETER LEGH GARRETT
BY
Christie, Parker & Hale
ATTORNEYS.

3,112,362
Patented Nov. 26, 1963

3,112,362

WRITTEN CHARACTER DIGITIZER

Edwin A. Pecker, Los Angeles, and Peter Legh Garrett, Santa Monica, Calif., assignors to Telautograph Corporation, Los Angeles, Calif., a corporation of Virginia Filed Aug. 8, 1960, Ser. No. 48,307
8 Claims. (Cl. 178—18)

This invention relates to character recognition apparatus, and more particularly, apparatus for digitally coding handwritten characters.

With the advent of digital computers and digital data processing equipment, the idea of translating handwritten characters directly into digital machine langauge has been investigated. Machines for scanning printed or written material, which has previously been written or printed, by scanning techniques have been developed. However, in in some business applications, it has been found desirable to translate handwritten characters into machine language as each character is being written. While some attempts have been made heretofore to convert the movements produced in the handwriting of written characters directly into a digital code which can be processed by digital equipment, such arrangements have resulted in one or more limitations in their use. For example, the written character must be written within a specific geometric area and be limited to a specific size. Characters must be written in a precise form and size, so as to bear a predetermined relationship to a fixed set of points. Such an arrangement results in a handwriting operation which is difficult and unnatural.

The present invention provides an arrangement for translating handwriting characters directly as they are formed. By the arrangement of the present invention, symbols can be written in a great range of sizes without any adjustment of the equipment. Within certain limits they may be written in the natural handwriting of the operator. The characters can be written anywhere within the limits of the writing area. Not only is the individual character directly digitized by the equipment, but digital information as to the position in which the symbol is written on a writing surface may also be digitized if desired to provide additional information.

In brief, the arrangement of the present invention includes a conventional telescriber unit by means of which motions of a writing stylus when manipulated by an operator are translated into analog signals that continuously represent the two coordinates of position of the moving stylus. In addition, the telescriber unit provides a signal indicating that the stylus has been lowered into engagement with the writing surface. Means is provided for generating a pair of reference voltages in response to the signal indicating that the pen has been engaged with the writing surface, the two reference voltages representing the coordinates of position of the point at which the stylus is pressed against the paper in initiating the writing of a particular character. Means is provided, responsive to the analog voltage signals and the reference voltage signals, for generating pulses on four separate outputs when the position voltages pass through predetermined values in relation to the reference voltages.

The number of counts on each output corresponds to the number of times the stylus passes through one boundary of one of two narrow zones extending parallel to the respective coordinates of position. The pulses from the four outputs are separately counted. The resulting four count conditions uniquely determine the character that is written.

For a better understanding of the invention, reference should be made to the accompanying drawings, wherein:

FIGURE 1 is a diagrammatic representation showing the theory of coding a written numeral;

FIGURE 2 is a table showing the code numbers for each of the ten arabic numeral characters;

FIGURE 4 is a block diagram of a logic circuit used in the circuit of FIGURE 3.

Figure 3:
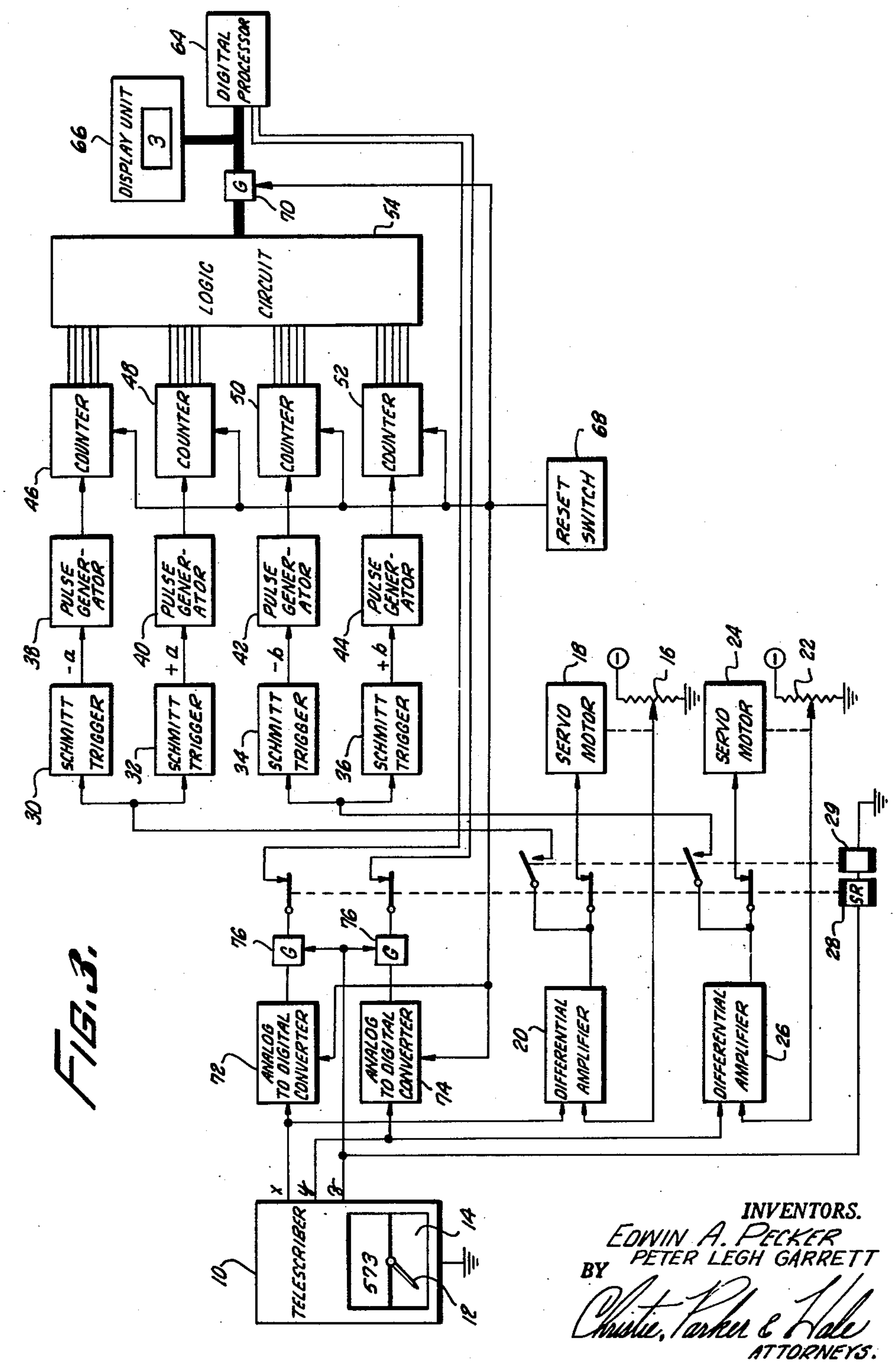
FIGURE 3 is a block diagram of one embodiment of apparatus for effecting recognition and digitizing of arabic numerals.

Referring to FIGURE 1, the principle of operation of the invention is illustrated in connection with the writing of the arabic numeral 2. When the numeral 2 is written in normal fashion, the writing instrument is placed down at the point marked "Start" and the writing implement is guided in a continuous line to the point marked "End." The point at which the writing instrument is placed down to start the execution of the numeral defines two rectangular coordinates $x$ and $y$ passing through the point. These two coordinates, in turn, are used to define two zones extending parallel to the two coordinates, the boundaries of the vertical zone being indicated at $-a$ and $+a$ and being equally spaced on either side of the $y$-axis, while the boundaries of the horizontal zone are indicated at $+b$ and $-b$ and are equally spaced on either side of the $x$-axis. The width of these zones are preferably equal and are considerably smaller than the height of the numerals as they are normally written.

Character recognition and digital coding is effected by counting the number of times the boundaries of the respective zones are crossed in executing the written character. Since there are four boundaries represented by the two zones, four digit numbers are used to represent each character. In the example shown in FIGURE 1, the $-a$ boundary is crossed twice, the $+a$ boundary is crossed three times, the $-b$ boundary is crossed once and the $+b$ boundary is crossed twice. Thus the code number generated by forming the numeral 2 is 2312. The table set fourth in FIGURE 2 shows the code numbers for each of the ten arabic characters. It will be noted that all of the characters have at least two different code numbers. These result from the normal differences in writing the numerical characters which occur due to variations in handwriting techniques. However, while each arabic character has more than one code number, no two arabic characters have the same code number. Thus the code number generated by counting the number of times the various boundaries are crossed always results in a unique determination of the arabic character as written.

Referring to FIGURE 3, a block diagram is shown of one embodiment of an apparatus for recognizing arabic characters as they are written and producing a digital representation of the written character. The numeral 10 indicates generally a telescriber unit which generates a pair of D.C. output signals on the lines $x$ and $y$ proportional to the rectangular coordinates of the position of a stylus 12 movable over the area of the writing surface 14. Telescribing unit 10 is also arranged to provide a potential on an output line $z$ when the stylus is pressed against the writing surface 14. Telescriber units which are capable of functioning in the above-described manner are well known. See, for example, Patent Nos. 2,847,502 and 2,916,550.

One of the features of the present invention is that the characters can be written anywhere on the writing surface. This requires that reference voltages be established which correspond to the point where the stylus engages the writing surface at the start of executing a character. The $x$-reference voltage is established by a potentiometer 16 connected across a potential source. The wiper contact of the potentiometer 16 is driven by a servo motor 18. The $x$-coordinate voltage and the $x$-reference voltage are both applied to the input of a differential amplifier 20 which produces an output signal proportional to the difference between the two potentials. This difference is initially applied to the servo motor 18 so as to adjust the potentiometer 16 in a manner to make the difference between the $x$-reference signal and the $x$-coordinate signal equal to zero, i.e. to maintain the reference voltage signal continuously equal to the $x$-coordinate signal as the latter signal changes with movement of the stylus 12.

Similarly, a $y$-reference voltage is derived from a potentiometer 22 connected across a potential source, the potentiometer 22 being adjusted by a servo motor 24. The $y$-coordinate voltage and the $y$-reference voltage are both applied to a differential amplifier 26, the output of which is used to control the servo motor 24. Differential amplifiers 20 and 26 are respectively connected to the servo motors 18 and 24 through the normally closed contacts of a relay 28. The coil of the relay 28 is connected to the $z$-output of the telescriber 10 so that the relay is actuated whenever the stylus is lowered into contact with the writing surface 14. In this manner, when the relay 28 is energized at the start of executing a written character by the lowering of the stylus into contact with the writing surface, the inputs to the servo motors 18 and 24 are disconnected and no further adjustment of the potentiometers 16 and 22 is effected during the execution of the character. The relay 28 is a slow release type so that it does not drop out if the stylus is momentarily lifted from the writing surface, as, for example, would occur in executing the arabic numeral 4.

To establish the boundaries of the respective zones and to provide an indication when the stylus in effect crosses over these boundaries, the output of the differential amplifier 20 is connected by the normally open contacts of a relay 29 to the input of two Schmidt trigger circuits 30 and 32. The output of the differential amplifier 26 is similarly connected to the input of two Schmidt trigger circuits 34 and 36. The Schmidt trigger circuits are well known bistable circuits which are triggered to one or the other of two stable conditions as an input level exceeds or drops below a predetermined bias level. The Schmidt trigger circuit 30 is biased to respond to changes in an input level above and below the voltage at the output of the differential amplifier corresponding to the displacement of the $-a$ boundary from the $y$-axis. For example, with the stylus on the start position, the output from the differential amplifier 20 is zero. If the stylus is moved to a point on the boundary $-a$ of the vertical zone, the output of the differential amplifier 20 may, for example, be $-10$ volts. The Schmidt trigger 30 is arranged such that it will trigger to one stable state if the input is less than $-10$ volts and be triggered to the other stable state when the input is greater than $-10$ volts.

Similarly, the Schmidt trigger 32 is biased such that it is triggered from one stable state to the other as the stylus is moved across the $+a$ boundary of the vertical zone. Also the Schmidt triggers 34 and 36 are biased so that they are triggered as the stylus is moved respectively across the $-b$ boundary and the $+b$ boundary of the horizontal zone. In this manner, a step voltage is produced at the output of each of the Schmidt triggers whenever the stylus moves across the corresponding boundary of the two zones.

The output of each of the Schmidt trigger circuits is connected to an associated pulse generator, as indicated respectively at 38, 40, 42 and 44. The pulse generator circuits are arranged to produce an output pulse in response to a step voltage on the input regardless of whether the step voltage is positive or negative. Thus an output pulse is produced by the respective pulse generators whenever the stylus is moved across a corresponding one of the boundaries of the two zones in either direction.

The pulses from the outputs of the respective pulse generators are counted by electronic counter circuits 46, 48, 50 and 52 respectively. After completion of the execution of an arabic numeral by the writing stylus 12 on the writing surface 14, the four counters will have been counted to the corresponding four digits of one of the code numbers as set forth in the table of FIGURE 2. The outputs of the counters, which may be binary, decimal, or any other suitable code, are applied to a logic circuit 54. The function of this circuit is to produce one output representation for each particular arabic numeral in response to the several possible count conditions established on the counters. The design of the logic circuit 54 depends upon what input and output codes are being used and upon the code numbers of the characters being translated. FIGURE 4 shows one example of a portion of the logic circuit for use with a one-out-of-five code on the input and a one-out-of-ten code on the output. FIGURE 4 shows only the portions of the logic circuit used in translation of a written arabic numeral 0.

In the example given in connection with FIGURE 4, the counters 46, 48, 50 and 52 energize one of five output lines depending upon their count condition. The five output lines are respectively numbered 0, 1, 2, 3 and 4. It will be seen from the table of FIGURE 2 that four is the maximum number of counts which is normally produced in reproducing the ten arabic numerals. Since there are three possible code numbers for the numeral 0, as shown by the table of FIGURE 2, three "and" circuits 56, 58 and 60 are provided and are arranged to respectively produce a high level output in response to a corresponding one of the three possible input code numbers established on the four counters. Thus the "and" circuit 56 senses the first code number 2220 by being coupled to the line 2 from the counter 46, being coupled to the line 2 of the counter 48, being coupled to the line 2 from the counter 50 and being coupled from the line 0 of the counter 52. A high level is produced for the numeral 0 by coupling each of the outputs of the "and" circuits 56, 58 and 60 to an "or" circuit 62. It will be readily apparent that by providing a group of "and" circuits, one for each of the possible code numbers of each of the other arabic numerals in the table of FIGURE 2, each connected to a selected one output line of each of the four counters and connecting the outputs of the group of "and" circuits to an "or" circuit, a high level can be produced on any one of ten outputs according to the various code numbers established in FIGURE 2.

The ten output lines from the logic circuit 54 are coupled to a digital processor or other equipment capable of receiving and operating on the digitally coded information derived from the logic circuit 54. The output from the logic circuit may also be coupled to a display unit 66, by which any one of the ten arabic numerals may be visually displayed in response to the digital information derived from the logic circuit 54. Decimal digit display units of a suitable type are well known in the art and form no part of the present invention.

A reset switch 68 is provided for resetting each of the counters. The reset switch 68 may also be arranged to operate a gate circuit 70 so as to pass the digital information from the logic circuit 54 to the display unit 66 and the digital processor 64 when the reset switch 68 is actuated.

In addition to providing digitized information as to the character written in the telescriber unit, the circuit of FIGURE 3 may also be arranged to provide positional information as to where on the writing surface the character is written. Position information may be important where, for example, a form is being filled out. The location of the numbers is significant in relation to various parts of the form. To this end, a pair of analog-to-digital converter circuits 72 and 74 may be connected to the $x$ and $y$ outputs of telescriber unit 10. These convert the analog position information represented by the voltages on the line $x$ and $y$ to corresponding digitally coded representations. The digital output of the converters may be connected to the digital processor 64 through normally closed gates 76 which are biased open by the $z$-signal and by normally closed contacts of the relay 28. Position information is passed to the digital processor 64 when the stylus is placed against the writing surface to initiate writing of a character. The gates 76 are opened, passing digital information to the processor until the relay 28 operates.

From the above description it will be recognized that apparatus is provided by which written characters may be recognized and translated into digital form for use directly in digital processing equipment. This operation is effected regardless of the size of the written character or its location on the writing surface. Moreover, the apparatus is arranged to recognize and digitize characters regardless of the normal variations in shape resulting from different handwriting characteristics.

While the invention has been described specifically as providing four reference borders and four corresponding counters, few borders and associated counters are possible for simple characters where four digit representation is not needed. Additional information is also available but not used in the sequence in which the borders are crossed and the associated counters are actuated. It will be apparent that such additional information may be used if necessary in decoding more complex characters.

What is claimed is:

1. Character recognition apparatus for digitally coding handwritten characters, said apparatus comprising a stylus movable over a writing surface, means responsive to movement of the stylus for generating first and second position voltages proportional respectively to first and second coordinates of position of the stylus, means responsive to movement of the stylus in and out of engagement with the writing surface for generating a signal when the stylus is down against the writing surface, means responsive to the stylus down signal for producing first and second reference voltages equal to the first and second position voltages generated at the point where the stylus engages the writing surface, means responsive to the first reference voltage and the first position voltage for generating pulses respectively on two separate outputs when the magnitude of the position voltage varies with respect to the reference voltage by a predetermined amount, means responsive to the second reference voltage and the second position voltage for generating pulses respectively on two separate outputs when the magnitude of the position voltage varies with respect to the reference voltage by a predetermined amount, counting means for separately counting the pulses from each of said four outputs during the writing of a character by the stylus, and decoding means responsive to the count condition of the counting means for generating an output signal indicative of the particular character represented by the count condition of the counting means.

2. Apparatus for generating a digitally coded representation of a written character comprising a stylus movable over a writing surface, means coupled to the stylus for generating first and second signals indicative of the coordinates of position of the stylus as the stylus moves over the writing surface, means for generating first and second reference signals indicative of the coordinates of position of the stylus at the point on the writing surface where the trace forming the characters starts, means responsive to the first position signal generating means and the first reference signal generating means for indicating when the stylus moves in and out of a first zone parallel to the first coordinate of position and including said point where the character trace starts, means responsive to the second position signal generating means and the second reference signal generating means for indicating when the stylus moves in and out of a second zone parallel to the other coordinates of position and including said point, and means responsive to said indicating means for counting the number of times the stylus moves through the boundaries of said first and second zones, the counting means providing a digital representation of the written character.

3. Apparatus for uniquely coding written characters as they are formed by a writing implement on a writing surface, said apparatus comprising means for generating first and second position signals indicative of the movements of the implement in relation respectively to first and second coordinate axes, means for generating a signal when the implement is pressed against the writing surface, means responsive to said last-named signal generating means for establishing first and second reference signals indicative respectively of a predetermined range of movement of the writing implement in relation respectively to the first and second coordinate axes, means responsive to the first position signal and the first reference signal for indicating the number of times the writing implement passes through said predetermined range of movement in relation to the first coordinate axis, and means responsive to the second position signal and the second reference signal for indicating the number of times the writing implement passes through said predetermined range of movement in relation to the second coordinate axis.

4. Character recognition apparatus comprising means movable in two dimensions for following the trace path of a written character, means actuated by said movable means for generating first and second signals that vary in proportion to changes in the respective two dimensions of position of the movable means, and means for counting each time the first and second signals are substantially equal to predetermined signal values during the interval the moving means follows the complete trace of the character.

5. Apparatus as defined in claim 4 further including means responsive to said counting means for sensing the count condition of the counting means and producing a character indicative output in response thereto.

6. Character recognition apparatus comprising means movable in two dimensions for following the trace path of a written character, means actuated by said movable means for generating at least one signal that varies in proportion to changes in the position of the movable means, and means for counting each time the signal is substantially equal to a predetermined signal value during the interval the moving means follows the complete trace path of the character.

7. Apparatus as defined in claim 6 further including means responsive to said counting means for sensing the count condition of the counting means and producing a character indicative output in response thereto.

8. The method of uniquely coding a written character comprising the steps of locating the starting point in the formation of the written character, establishing mutually perpendicular axes passing through said point, establishing a first zone having boundaries parallel to and positioned respectively on either side of one of said axes, establishing a second zone having boundaries parallel to and positioned respectively on either side of the other of said axes, and separately counting the number of times each of said boundaries is crossed in the formation of the written character.

References Cited in the file of this patent

UNITED STATES PATENTS

| | | |
|---|---|---|
| 2,583,535 | Adler | Jan. 29, 1952 |
| 2,682,045 | Crost | June 22, 1954 |